(12) United States Patent
Chang

(10) Patent No.: US 7,599,613 B2
(45) Date of Patent: Oct. 6, 2009

(54) IMAGE CAPTURING APPARATUS

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 58 days.

(21) Appl. No.: 12/018,735

(22) Filed: Jan. 23, 2008

(65) Prior Publication Data

US 2008/0260365 A1 Oct. 23, 2008

(30) Foreign Application Priority Data

Apr. 20, 2007 (CN) .................... 2007 1 0200489

(51) Int. Cl.
*G03B 29/00* (2006.01)
*G06K 9/00* (2006.01)
*G02B 23/24* (2006.01)

(52) U.S. Cl. ................ 396/15; 382/126; 359/362
(58) Field of Classification Search ............ 396/15
See application file for complete search history.

(56) References Cited

U.S. PATENT DOCUMENTS

| | | | |
|---|---|---|---|
| 6,052,475 A * | 4/2000 | Upton | 382/125 |
| 6,088,585 A * | 7/2000 | Schmitt et al. | 455/411 |
| 6,191,410 B1 * | 2/2001 | Johnson | 250/208.1 |
| 6,643,390 B1 * | 11/2003 | Clark et al. | 382/124 |
| 6,856,695 B1 * | 2/2005 | Nakamura et al. | 382/124 |
| 7,139,414 B1 * | 11/2006 | Suzuki et al. | 382/126 |
| 7,231,070 B2 | 6/2007 | Bjorn et al. | 382/124 |
| 2002/0146157 A1 | 10/2002 | Goodman et al. | 382/127 |
| 2003/0062490 A1 | 4/2003 | Fujieda | 250/208.1 |
| 2008/0247613 A1 * | 10/2008 | Chang | 382/124 |

FOREIGN PATENT DOCUMENTS

| | | |
|---|---|---|
| CN | 1267503 A | 9/2000 |
| JP | 2004-64499 A | 2/2004 |
| JP | 2006-81113 A | 3/2006 |
| JP | 2006-311358 A | 11/2006 |

\* cited by examiner

*Primary Examiner*—Melissa J Koval
(74) *Attorney, Agent, or Firm*—Clifford O. Chi

(57) ABSTRACT

An image capturing apparatus includes a main body, a cover having a through hole, an image sensor and a first lens received in the main body, a second lens received in the through hole, and a light source embedded in the main body. The first lens has a bottom surface with a first curved portion, a first flat surface and a side surface. The light source is configured for illuminating the first flat surface. The second lens has a top surface with a second curved portion, and a second flat surface. Wherein the cover is movable relative to main body between a first position where the second lens is away from the first lens such that the first flat surface is exposed, and a second position where the second flat surface faces towards the first flat surface and the second curved portion aligns with the first curved portion.

11 Claims, 7 Drawing Sheets

IMAGE CAPTURING APPARATUS

BACKGROUND

1. Technical Field

The present invention relates to image capturing apparatuses, and particularly, to an image capturing apparatus having changeable lens assembly to allow capturing fingerpad images and common images of photographic interest.

2. Description of Related Art

Currently, fingerprint identification has become the most typical and promising branch of biometrics. Fingerprint identification is beginning to be used for application in various portable electronic devices, such as personal computers, mobile phones, and personal digital assistants. Such portable electronic devices are also required to have good image performance in capturing common images.

Capturing of fingerpad images is one of the key techniques of fingerprint identification. A lens or a lens assembly for capturing fingerpad images is required to be defined at a position where the lens can capture a best/clearest image of the fingerpad placed thereon. As a result, the lens is too specialized and does not provide a satisfying result in capturing common images, because object distances are usually much longer.

What is needed, therefore, is an image capturing apparatus which has changeable lens assembly to allow capturing fingerpad images and common images of photographic interest.

SUMMARY

In an embodiment, an exemplary image capturing apparatus includes a main body having a first recess, a cover having a through hole, an image sensor and a first lens received in the first recess, a second lens received in the through hole, and a light emitting device embedded in the main body. The first lens has a bottom surface with a first curved portion facing towards the image sensor, a first flat surface facing away from the bottom surface, and a side surface interconnected between the bottom surface and the first flat surface. The light emitting device faces towards the side surface of the first lens. The light emitting device is configured for emitting light to illuminate the first flat surface. The second lens has a top surface with a second curved portion, and a second flat surface facing away from the top surface. Wherein the cover is movable relative to the main body between a first position where the second lens is disposed at a lateral side of the first lens such that the first flat surface of the first lens is exposed to an outside of the main body for capturing human fingerpad images, and a second position where the second flat surface of the second lens faces towards the first flat surface of the first lens, and the second curved portion of the second lens is aligned with the first curved portion of the first lens for capturing common images of photographic interest.

Other advantages and novel features of the present invention will become more apparent from the following detailed description of preferred embodiment when taken in conjunction with the accompanying drawings.

BRIEF DESCRIPTION OF THE DRAWINGS

Many aspects of the image capturing apparatus can be better understood with reference to the following drawings. The components in the drawing are not necessarily drawn to scale, the emphasis instead being placed upon clearly illustrating the principles of the present image capturing apparatus. Moreover, in the drawings, like reference numerals designate corresponding parts throughout the several views.

DETAILED DESCRIPTION OF THE PREFERRED EMBODIMENTS

Embodiments of the present image capturing apparatus will now be described in detail below and with reference to the drawings.

Figure 1:
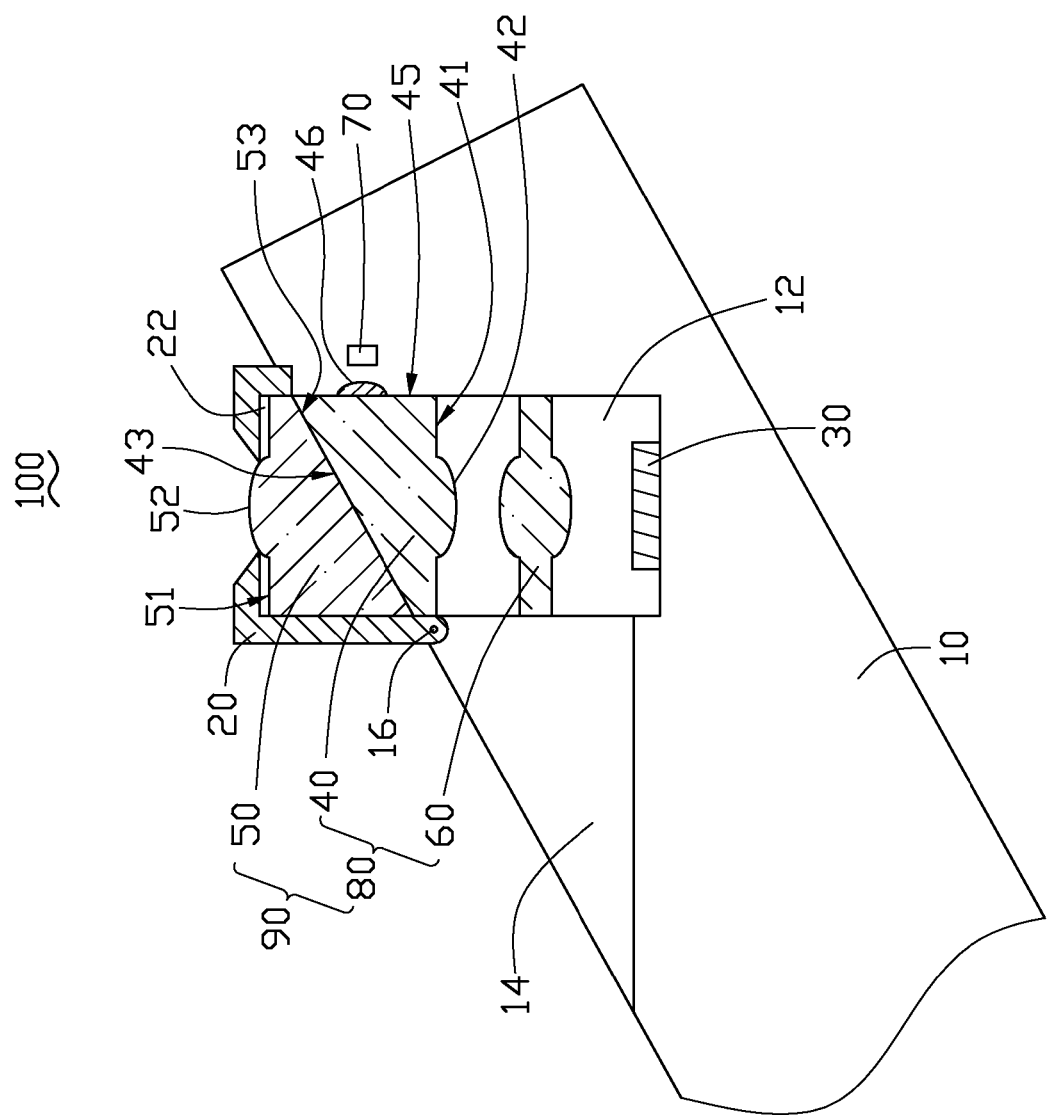
FIG. 1 is a partially cut-away view of an image capturing apparatus according to a first embodiment of the present invention.
Figure 2:
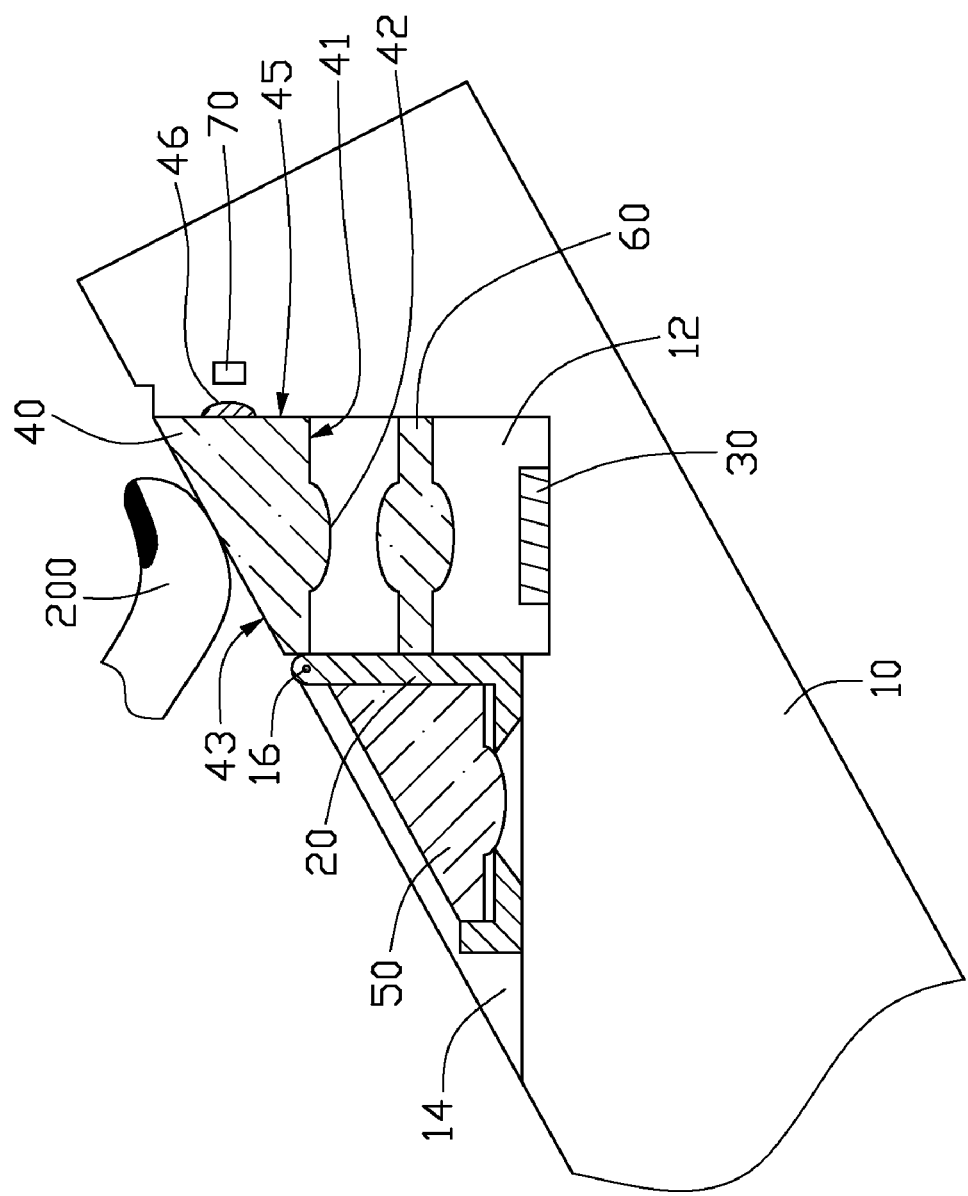
FIG. 2 is a partially cut-away view of the image capturing apparatus shown in FIG. 1 when the image capturing apparatus is capturing an image of a human fingerpad placed thereon.

Referring to FIGS. 1 to 2, an exemplary image capturing apparatus 100 according to a first embodiment is shown. The image capturing apparatus 100 includes a main body 10, a cover 20, an image sensor 30, a first lens 40, a second lens 50, a third lens 60, and a light emitting device 70.

The main body 10 has a first recess 12, and a second recess 14 adjacent to the first recess 12. The cover 20 is in a barrel shape and has a through hole 22. The cover 20 is pivotably mounted on the main body 10 by a shaft 16. The cover 20 can be pivoted relative to the main body 10 between a first position (see FIG. 2), and a second position (see FIG. 1). In the first position, the cover 20 is opened relative to the main body 10, and is received in the second recess 14 of the main body 10.

The image sensor 30 is received in the first recess 12 of the main body 10. The image sensor 30 can be a charge coupled device (CCD for short) or a complementary metal oxide semiconductor transistor (CMOS for short).

The first lens 40 and the third lens 60 are also received in the first recess 12 of the main body 10. The first lens 40 is generally triangular. The first lens 40 defines a bottom surface 41, a first flat surface 43, and a side surface 45 between the bottom surface 41 and the first flat surface 43. The side surface 45 is perpendicular to the bottom surface 41. The first flat surface 43 is slanted relative to the side surface 45. A first curved portion 42 is provided on the bottom surface 41 facing towards the third lens 60. A third curved portion 46 is provided on the side surface 45. The first lens 40 and the third lens 60 cooperatively define a first lens assembly 80. The first lens assembly 80 is designed to be able to capture a best/clearest image of an object placed on the first flat surface 43.

The second lens 50 is received in the through hole 22 of the cover 20. The second lens 50 is also generally triangular. The second lens 50 defines a top surface 51, and a second flat surface 53. A second curved portion 52 is provided on the top surface 51. A material of the second lens 50 is the same as that of the first lens 40. When the cover 20 is pivoted to cover the first flat surface 43, as shown in FIG. 1, the second flat surface 53 of the second lens 50 meets the first flat surface 43 of the first lens 40, the second curved portion 52 of the second lens 50 is aligned with first curved portion 42 of the first lens 40. At this position, the first lens 40, the second lens 50 and the third lens 60 cooperatively define a second lens assembly 90. The second lens assembly 90 is designed to be able to capture a best/clearest common image of photographic interest not in contact with the image capturing apparatus 100.

The light emitting device 70 is a red light emitting device, a green light emitting device, or a blue light emitting device. The light emitting device 70 is embedded in the main body 10 facing the third curved portion 46. The third curved portion 46 of the second lens 40 can focus light from the light emitting device 70 onto the first flat surface 41 of the first lens 40.

The image capturing apparatus 100 works as follows.

In capturing fingerpad images, as shown in FIG. 2, the user first pivots the cover 20 to the first position wherein the cover 20 is received in the second recess 14 of the main body 10, then turns on the light emitting device 70, and a human fingerpad 200 is placed on the first flat surface 43 of the first lens 40. However, before placing the fingerpad 200 on the first flat surface 43, an anti-fingerprint film (not shown) is preferably put on the first flat surface 43 or on the fingerpad 200 to protect the flat surface 43. The fingerpad 200 is illuminated by the light from the light emitting device 70. The first lens assembly 80 captures an image of the fingerpad 200. The image sensor 30 receives and converts the image of the fingerpad 200 into electronic fingerprint data. After that, a processor (not shown) in the main body 10 receives and compares the electronic fingerprint data with pre-stored fingerprint data to verify the fingerprint of the fingerpad 200.

In capturing common images, the user turns off the light emitting device 70, and, as shown in FIG. 1, pivots the cover 20 to the second position. The second lens assembly 90 captures a common image from outside. The image sensor 30 receives and converts the image from outside into electronic data associated with the image. Due to the change to the second lens assembly 90 from the first lens assembly 80, the image capturing apparatus 100 is able to capture good images from outside, in which object distances are much longer.

Figure 3:
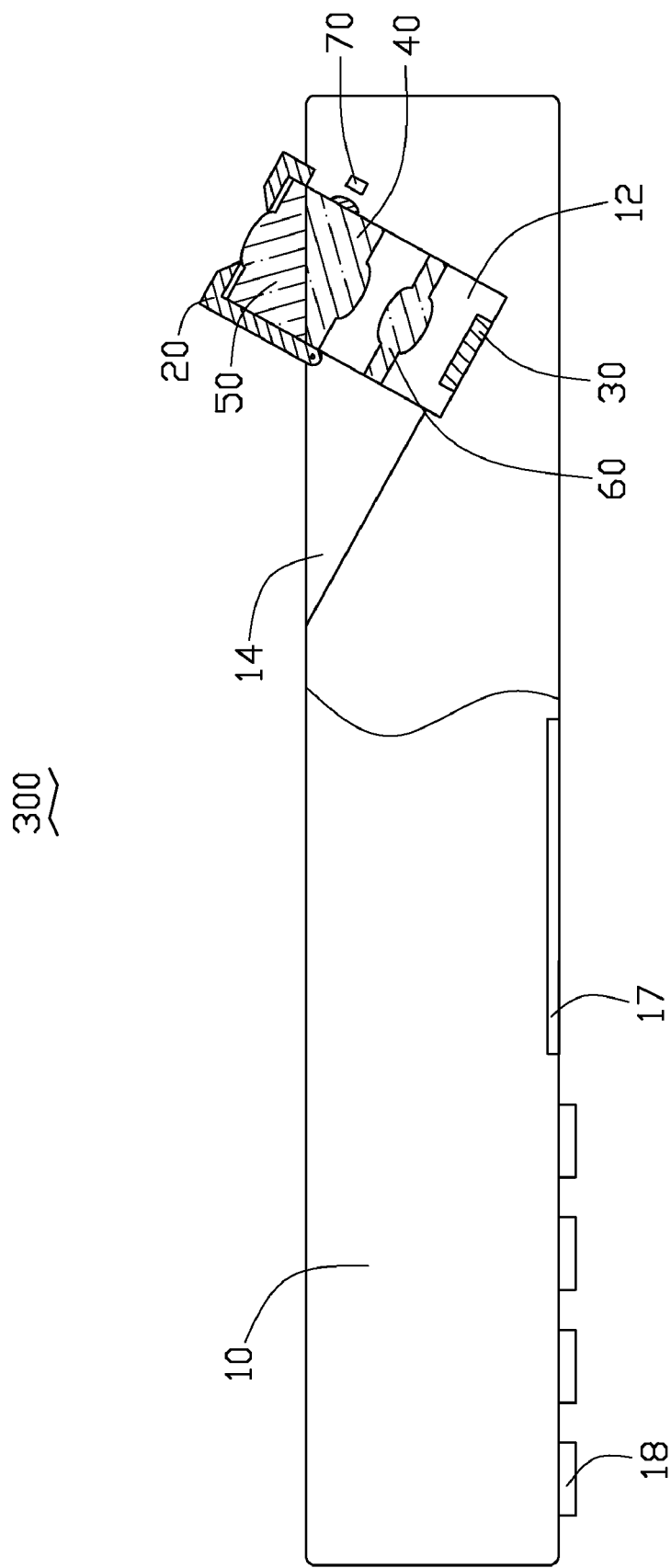
FIG. 3 is a partially cut-away view of an image capturing apparatus according to a second embodiment of the present invention.
Figure 4:
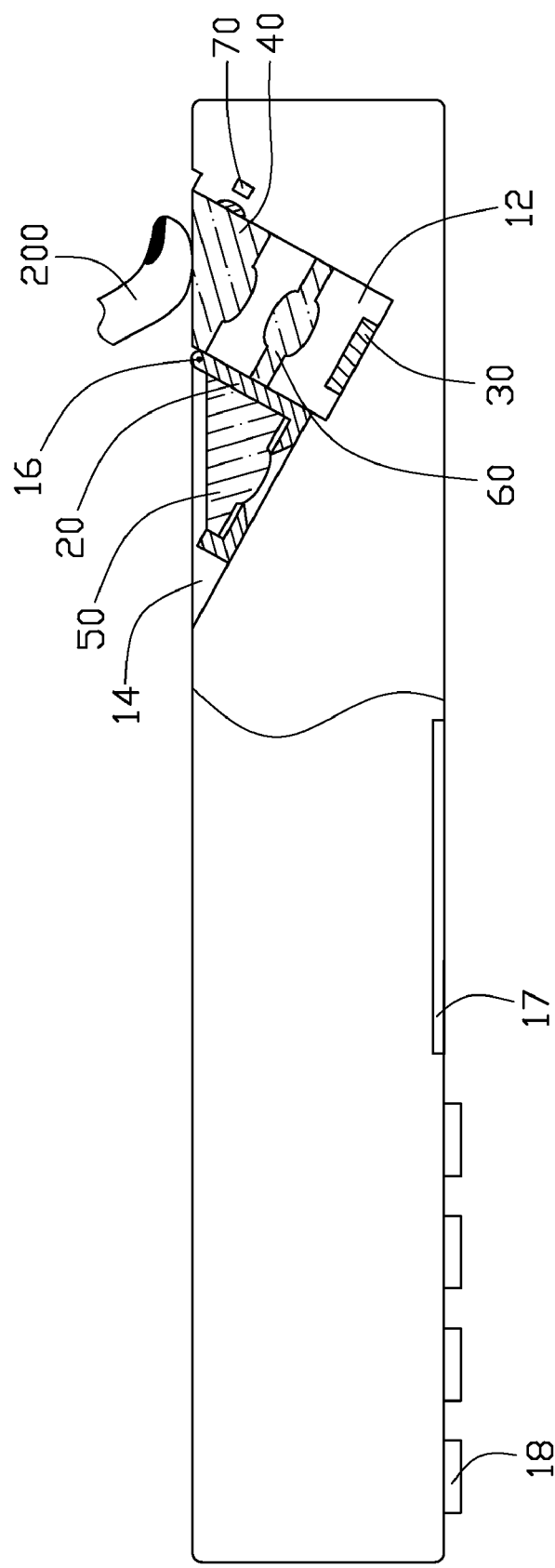
FIG. 4 is a partially cut-away view of the image capturing apparatus shown in FIG. 3 when the image capturing apparatus is capturing an image of a human fingerpad placed thereon.

Referring to FIGS. 3 to 4, an image capturing apparatus 300 according to a second embodiment is shown. In the image capturing apparatus 300, a display 17 and a keyboard 18 are provided on the main body 10. The image capturing apparatus 300 can be a mobile phone.

Figure 5:
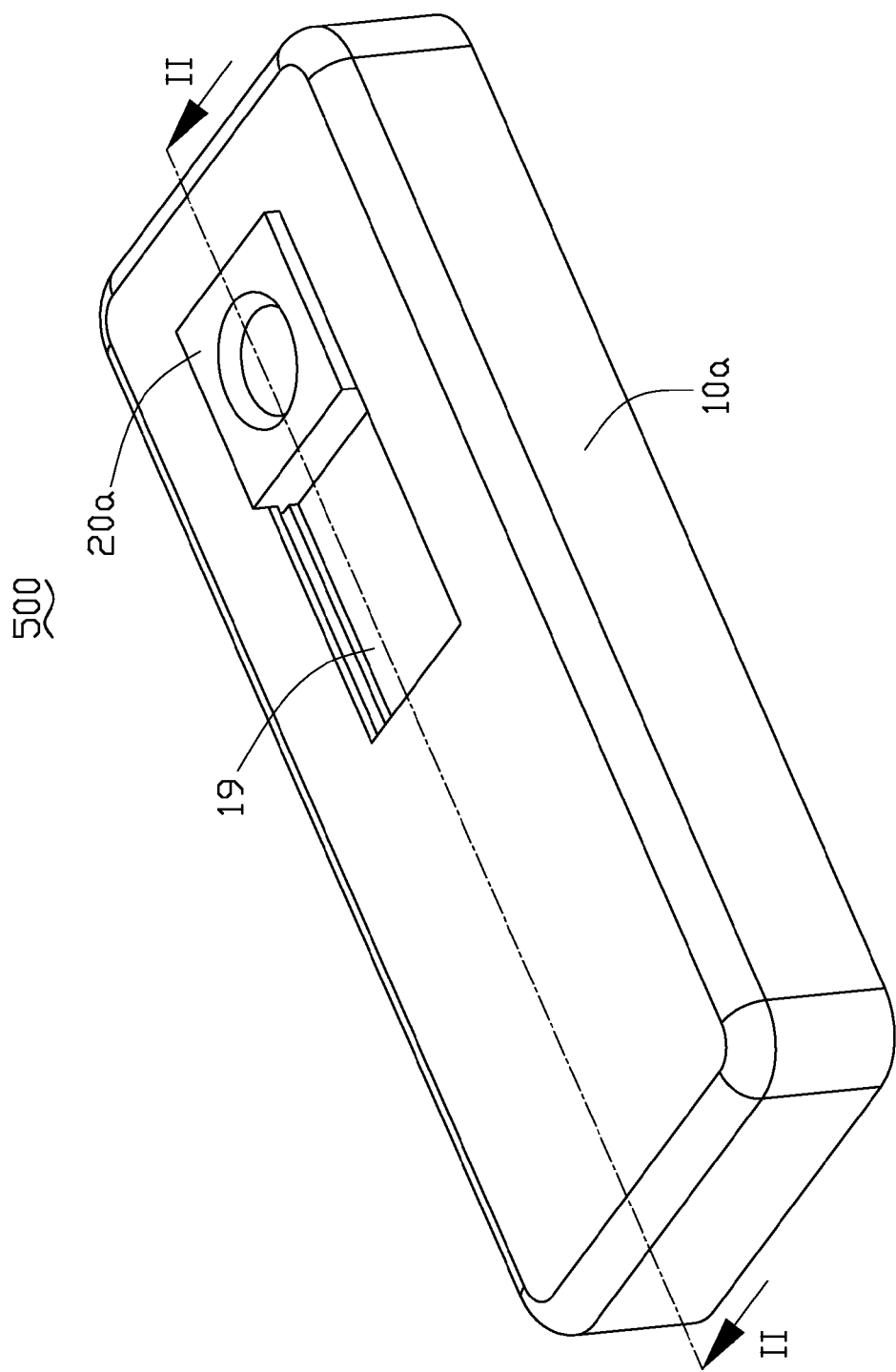
FIG. 5 is a schematic view of an image capturing apparatus according to a third embodiment of the present invention.
Figure 6:
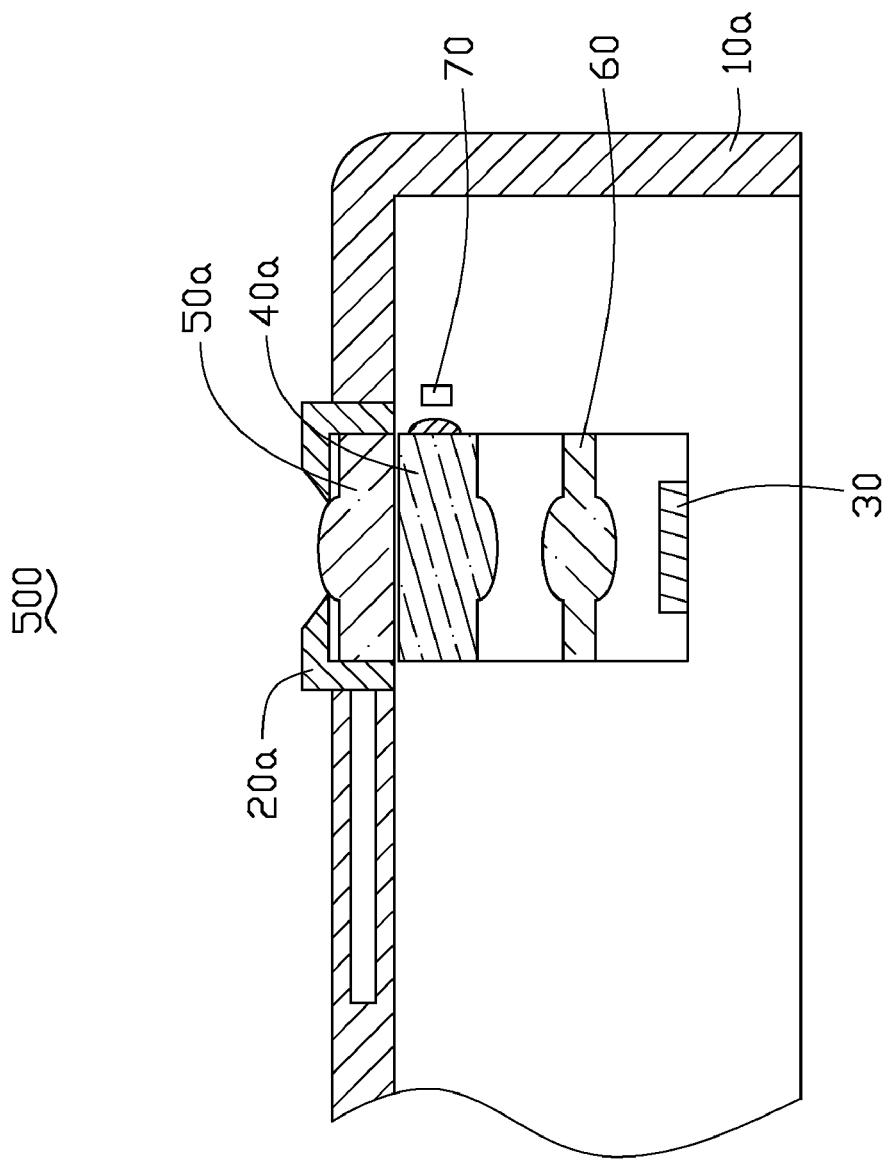
FIG. 6 is a partially cut-away view taken along line II-II of the image capturing apparatus shown in FIG. 5.
Figure 7:
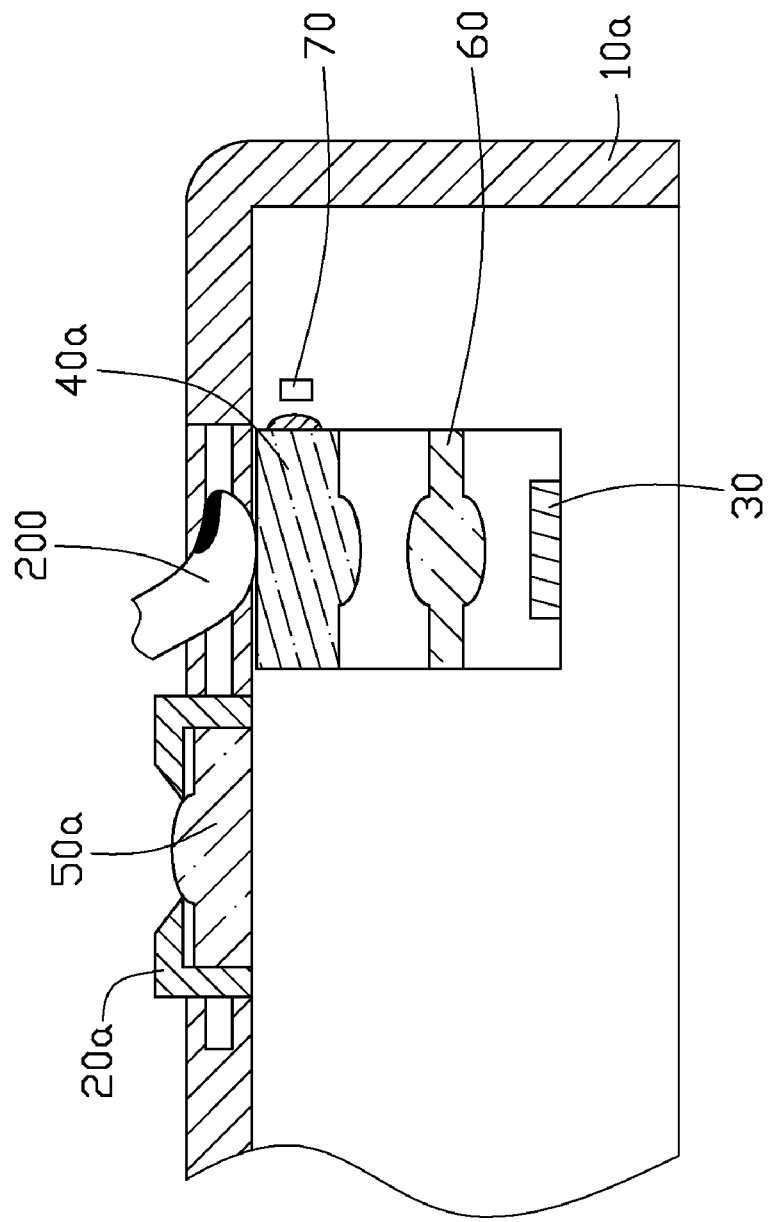
FIG. 7 is a partially cut-away view of the image capturing apparatus shown in FIG. 6 when the image capturing apparatus is capturing an image of a human fingerpad placed thereon.

Referring to FIGS. 5 to 7, an image capturing apparatus 500 according to a third embodiment is shown. The image capturing apparatus 500 is essentially similar to the image capturing apparatus 100 illustrated above, however, a groove 19 is provided on the main body 10a, the cover 20a is slidably mounted in the groove 19. The first lens 40a and the second lens 50a each are mainly rectangular.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An image capturing apparatus, comprising:
   a main body having a first recess;
   a cover having a through hole;
   an image sensor received in the first recess of the main body;
   a first lens received in the first recess of the main body, the first lens having a bottom surface having a first curved portion facing towards the image sensor, a first flat surface facing away from the bottom surface, and a side surface interconnected between the bottom surface and the first flat surface;
   a light emitting device embedded in the main body and facing towards the side surface of the first lens for emitting light to illuminate the first flat surface; and
   a second lens received in the through hole of the cover, the second lens having a top surface having a second curved portion thereon, and a second flat surface facing away from the top surface,
   wherein the cover is movable relative to the main body between a first position where the second lens is disposed at a lateral side of the first lens such that the first flat surface of the first lens is exposed to an outside of the main body for capturing human fingerpad images, and a second position where the second flat surface of the second lens faces towards the first flat surface of the first lens, and the second curved portion of the second lens is aligned with the first curved portion of the first lens for capturing common images of photographic interest.

2. The image capturing apparatus as described in claim 1, wherein the cover is pivotably mounted on the main body.

3. The image capturing apparatus as described in claim 2, wherein the main body has a second recess thereon, the cover is received in the second recess at the first position.

4. The image capturing apparatus as described in claim 1, wherein the main body has a groove thereon, the cover is slidably mounted in the groove.

5. The image capturing apparatus as described in claim 1, wherein the side surface has a third curved portion configured for guiding the light into the first lens.

6. The image capturing apparatus as described in claim 5, wherein the first flat surface is slanted relative to the side surface of the first lens.

7. The image capturing apparatus as described in claim 1, further comprising a third lens disposed between the first lens and the image sensor.

8. The image capturing apparatus as described in claim 1, wherein a material of the first lens is the same as that of the second lens.

9. The image capturing apparatus as described in claim 1, wherein the light emitting device is a red light emitting device, a green light emitting device or a blue light emitting device.

10. The image capturing apparatus as described in claim 1, wherein the main body has a display and a keyboard thereon.

11. An image capturing apparatus comprising:
    a main body having a recess;
    a cover pivotably mounted on the main body, the cover having a through hole;
    an image sensor received in the main body;
    a first lens received in the main body, the first lens having a bottom surface having a first curved portion facing towards the image sensor, a first flat surface facing away from the bottom surface, and a side surface interconnected between the bottom surface and the first flat surface;
    a light emitting device embedded in the main body and facing towards the side surface of the first lens for emitting light to illuminate the first flat surface; and
    a second lens received in the through hole of the cover, the second lens having a top surface having a second curved portion thereon, and a second flat surface facing away from the top surface, wherein the cover and the second lens are rotatable relative to the main body between a first position where the cover and the second lens are received in the recess and the first flat surface of the first lens is exposed to an outside of the main body for capturing human fingerpad images, and a second position where the second flat surface of the second lens faces towards the first flat surface of the first lens, and the second curved portion of the second lens is aligned with the first curved portion of the first lens for capturing common images of photographic interest.

* * * * *